United States Patent
Kim

(10) Patent No.: US 6,530,740 B2
(45) Date of Patent: Mar. 11, 2003

(54) HAND TRUCK WITH ELECTRICALLY OPERATED LIFTING PLATFORM

(75) Inventor: Jin Yu Kim, Daegu (KR)

(73) Assignee: Dong-Hun Jung, Daegu (KR)

( * ) Notice: Subject to any disclaimer, the term of this patent is extended or adjusted under 35 U.S.C. 154(b) by 0 days.

(21) Appl. No.: 09/828,184

(22) Filed: Apr. 9, 2001

(65) Prior Publication Data

US 2001/0038786 A1 Nov. 8, 2001

(30) Foreign Application Priority Data

Apr. 7, 2000 (KR) ............................................. 00-10344
Jul. 27, 2000 (KR) ............................................. 00-21745

(51) Int. Cl.$^7$ ................................................. B62B 3/00
(52) U.S. Cl. ................. 414/490; 280/47.21; 280/47.29; 180/251; 414/444; 414/673; 254/7 R; 187/267
(58) Field of Search ................................ 414/490, 444, 414/540, 590, 673; 298/1 C; 187/222, 232, 224, 233, 267; 280/47.28, 47.29, 47.17, 47.24, 63; 254/7 R, 7 B, 7 C; 180/245, 251, 341

(56) References Cited

U.S. PATENT DOCUMENTS 2,533,549 A * 12/1950 Bell ............................ 298/1 C
2,606,770 A * 8/1952 Reichert .................... 280/47.29
3,907,138 A * 9/1975 Rhodes .................... 414/490 X
4,049,083 A * 9/1977 Garvey ........................ 414/607
5,251,922 A * 10/1993 Mann ..................... 414/490 X
5,467,840 A * 11/1995 Becheret et al. ............. 180/251
5,575,605 A * 11/1996 Fisher ......................... 414/490
6,273,438 B1 * 8/2001 Prapavat ................... 280/47.21

FOREIGN PATENT DOCUMENTS

CH 664146 * 2/1988 ................. 414/490
FR 2634442 * 1/1990 ................. 414/444

* cited by examiner

Primary Examiner—Frank E. Werner
(74) Attorney, Agent, or Firm—Jacobson Holman PLLC

(57) ABSTRACT

This invention relates to a hand truck with an electrically operated lifting platform. The hand truck includes a frame on both sides of which two guide rails are formed. The frame is provided with a screw shaft vertically supported on the frame to be vertically moved, one or more stabilizing bars forwardly extended from the frame, and two wheels rotatably attached to the rear portion of the frame. A lifting platform is guided by the guide rails and engaged with the screw shaft. A platform moving unit is comprised of a first drive motor for providing rotating force. The platform is situated in the lifting platform to allow the lifting platform to be moved selectively upward and downward along the screw shaft by the operation of the first drive motor. A control unit is electrically and controllably connected to the first drive motor and a power source.

6 Claims, 12 Drawing Sheets

HAND TRUCK WITH ELECTRICALLY OPERATED LIFTING PLATFORM

BACKGROUND OF THE INVENTION

1. Field of the Invention

The present invention relates generally to hand trucks for facilitating the conveying, loading and unloading of cargo, and more particularly to a hand truck with an electrically operated lifting platform, which is capable of lowering the costs of manufacture and maintenance and improving convenience in handling and safety.

2. Description of the Prior Art

In general, in order to convey, load and unload massive cargo, a plurality of pillars and rails are arranged in a factory and a hoist is mounted so as to be moved along the rails.

However, this kind of arrangement necessitates high installation costs, has lower rapidity and inconvenient working procedure to convey relatively small cargo, and requires to use separate conveying means and lifting means in an area outside of the area over which rails are extended.

On the meantime, a hydraulic pallet truck is proposed so as to convey, load or unload cargo to which the hoist cannot be applied or is not easily applied. In the hydraulic pallet truck, two wheels are rotatably attached to both sides of the lower end of the frame, a stabilizing plate is forwardly extended from the lower end of the frame, a handle is formed at the upper end of the frame, and a lifting mechanism is mounted to the frame.

The lifting mechanism is comprised of two forks attached to the frame to selectively lift up and lower down cargo while supporting the cargo, a hydraulic drive unit to drive the forks, and a control unit to control the operation of the lifting mechanism. In the lifting mechanism, the forks are moved upward and downward along the frame by the action of the hydraulic drive unit through the control of the control unit, and, accordingly, cargo placed on the forks is lifted up and lowered down with the movement of the forks.

However, the conventional hydraulic pallet truck is expensive and relatively heavy because its hydraulic drive unit and control unit should be provided, and causes inconvenience to a user because its forks cannot be brought into contact with the ground owing to the large mounting space of hydraulic drive unit and should be supported by a support.

Additionally there is proposed another hand truck with a lifting fork unit, in which a square screw shaft is rotatably and vertically supported by a frame, a drive motor is mounted on the lower portion of the frame and connected to the screw shaft, and a lifting fork unit is engaged with the screw shaft to be vertically moved along the screw shaft. Accordingly, the screw shaft is rotated by the operation of the drive motor, the lifting fork unit is selectively lifted up and lowered down by the rotation of the screw shaft, and cargo is selectively lifted up and lowered down by the movement of the lifting fork unit.

However, the conventional hand truck has inferior safety because their screw shafts are exposed to the outside, and is costly because its rapid ascent control unit and drive unit are expensive.

SUMMARY OF THE INVENTION

Accordingly, the present invention has been made keeping in mind the above problems occurring in the prior art, and an object of the present invention is to provide a hand truck with an electrically operated lifting platform, in which a lifting platform is attached to a frame provided at its lower ends with wheels to be moved selectively upward and downward, and a platform moving unit is situated in the lifting platform to be controlled by a drive control unit, thereby having a simple structure, being manufactured at lower costs and obtaining the same output as that of a conventional hand truck.

In order to accomplish the above object, the present invention provides a hand truck with an electrically operated lifting platform, comprising; a frame on both sides of which two guide rails are formed, the frame being provided with a screw shaft vertically supported on the frame to be vertically moved, one or more stabilizing bars forwardly extended from the frame and two wheels rotatably attached to the rear portion of the frame; a lifting platform guided by the guide rails and engaged with the screw shaft; a platform moving unit comprised of a first drive motor for providing rotating force, said platform being situated in the lifting platform to allow the lifting platform to be moved selectively upward and downward along the screw shaft by the operation of the first drive motor; and a control unit electrically and controllably connected to the first drive motor and a power source.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
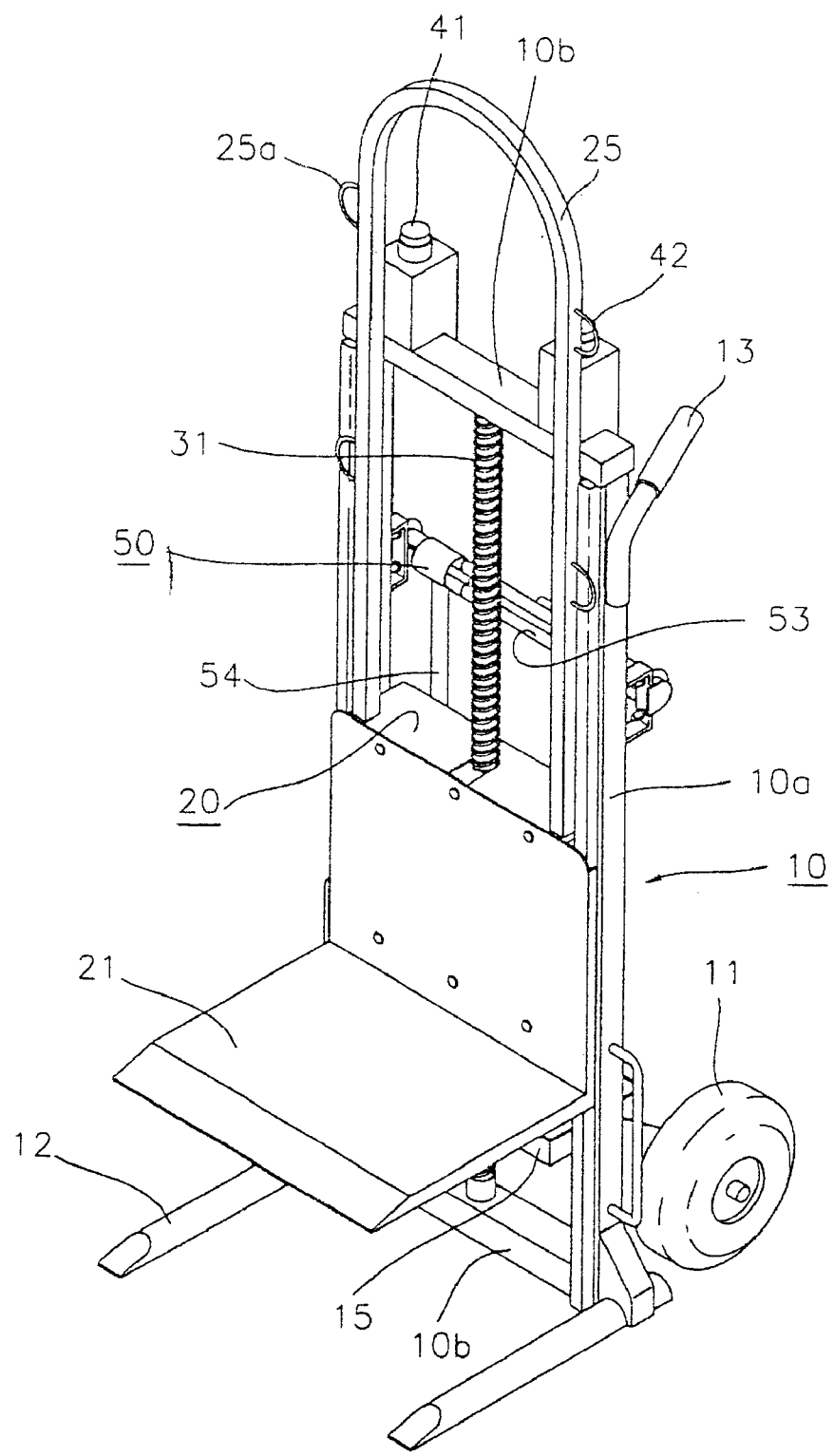
FIG. 1 is a perspective view of a hand truck with an electrically operated lifting platform in accordance with an embodiment of the present invention.

Reference now should be made to the drawings, in which the same reference numerals are used throughout the different drawings to designate the same or similar components.

Figure 2:
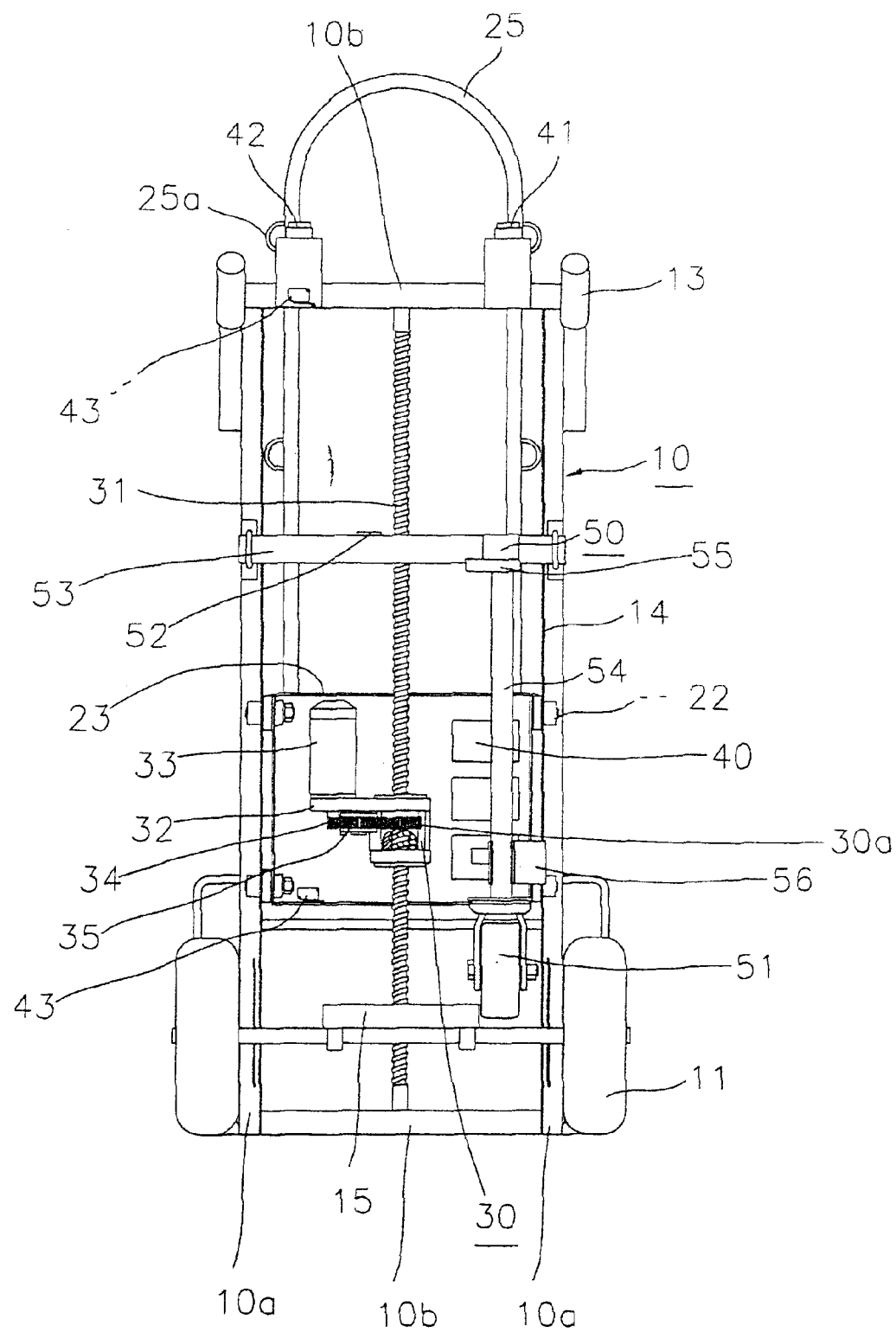
FIG. 2 is a rear view of the hand truck with its cover removed from its frame.

As shown in FIGS. 1 and 2, a lifting platform 20 is attached to a frame 10, which is provided at both sides of the frame 10 with two wheels 11 and has a form of a carrier. A platform moving unit is situated in the lifting platform 20 and controlled by a control unit.

When a switch is manipulated, the application of electricity to the platform moving unit is controlled by the control unit, and the lifting platform 20 is lifted up and lowered down along both sides of the frame 10 in accordance with the control of the control unit, thereby moving cargo selectively upward and downward.

Figure 3:
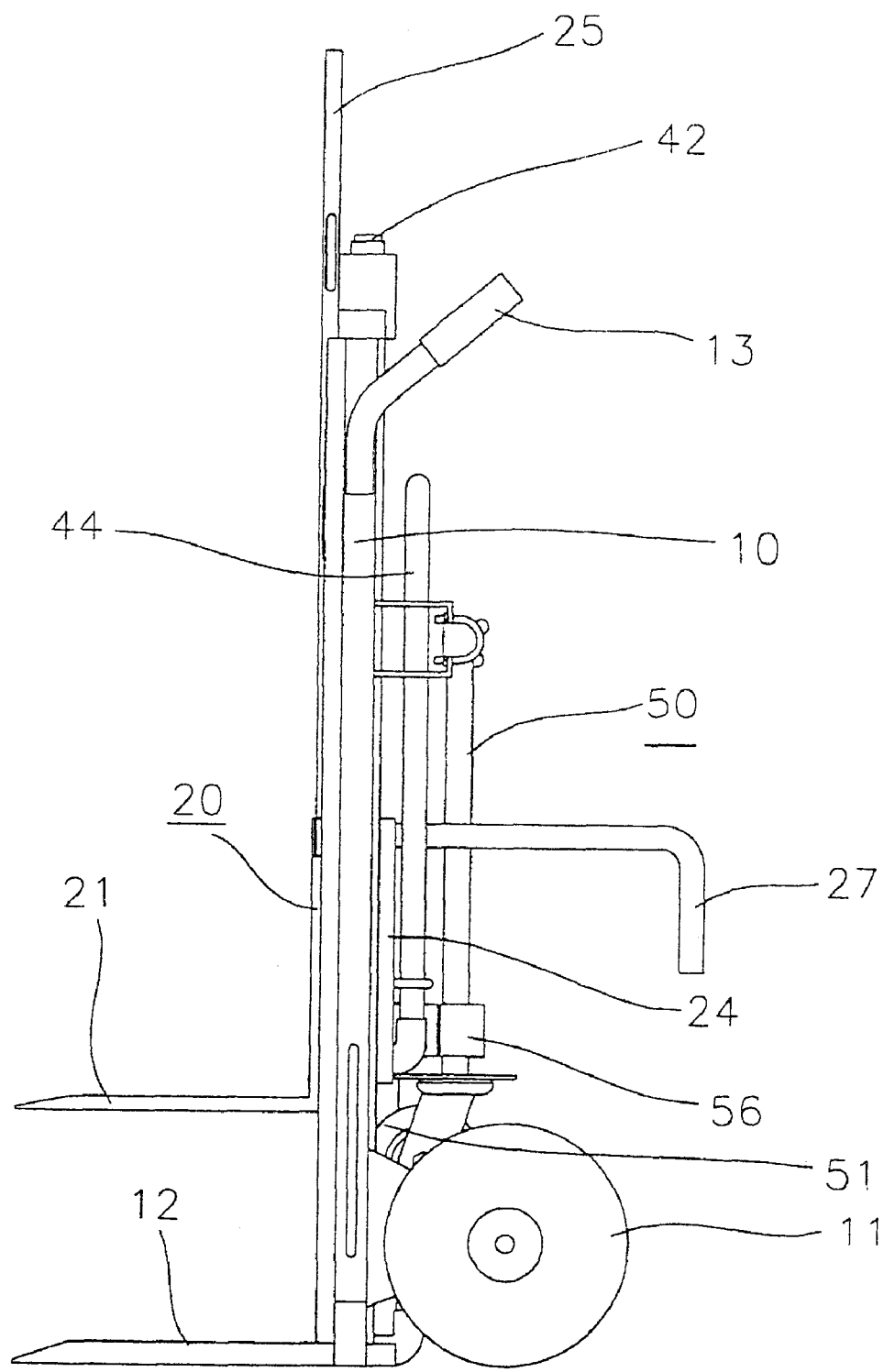
FIG. 3 is a side view showing the hand truck that is provided with two hooks.
Figure 4:
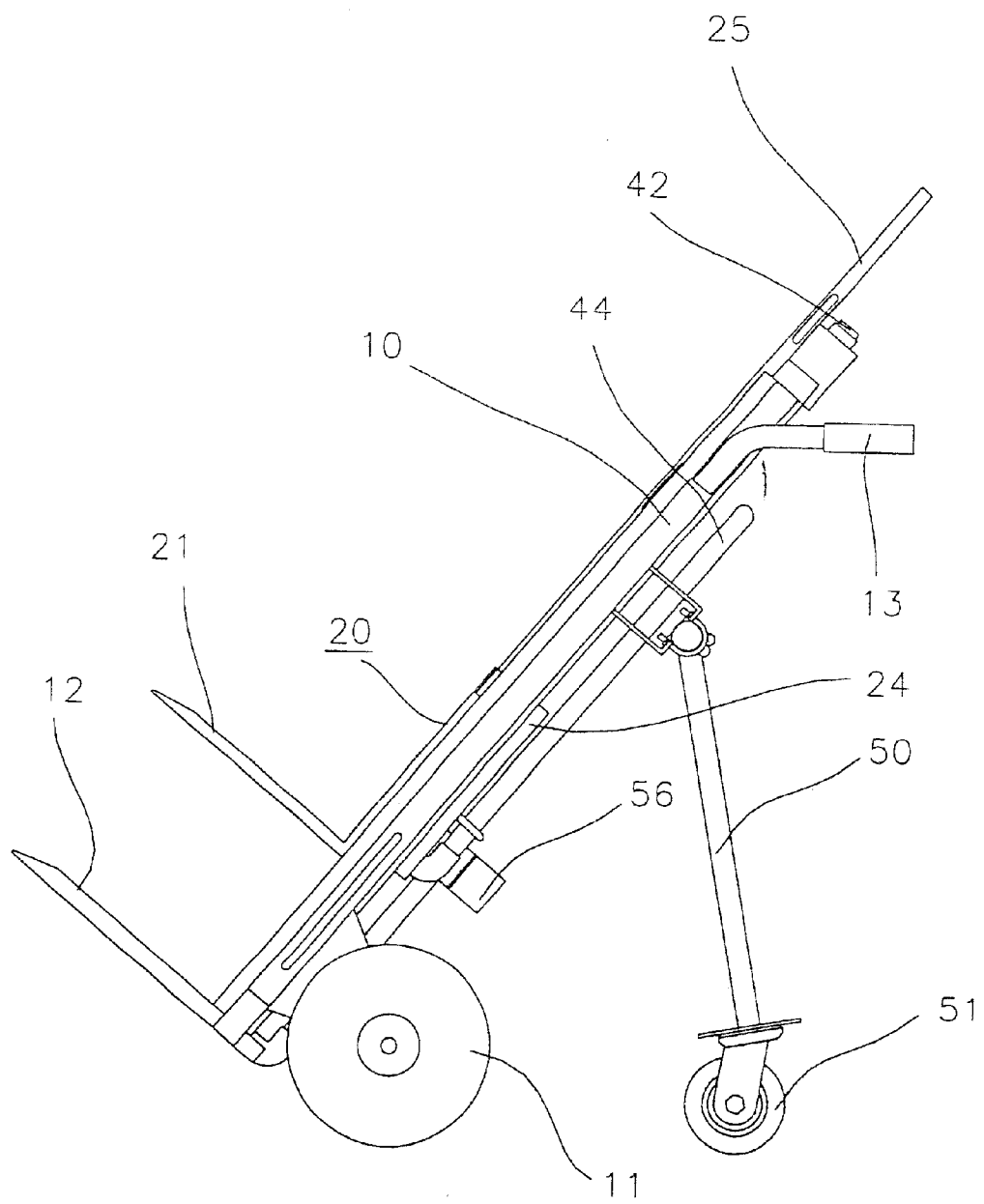
FIG. 4 is a side view showing the hand truck that is provided with an auxiliary support pole unit.

The frame 10, as depicted in FIGS. 1 to 3, is constructed in such a way that two spaced vertical rods 10a having an equal height are connected by two crosspieces, respectively, at upper and lower ends, two stabilizing bars 12 are forwardly extended from the lower ends of the vertical rods 10a to form an obtuse angle of about 95° with the vertical rods 10a, and two handles 13 are rearwardly extended from the upper ends of the vertical rods 10a. Additionally, two guide rails 14 are formed on the inner sides of the vertical rods 10a, and the side ends of the lifting platform 20 are movably supported by the guide rails 14. A screw shaft 31 is supported at its upper and lower ends by the center portions of the upper and lower crosspieces 10b, and serves to support the lifting platform 20. A battery tray 15 is mounted on the lower portion of the frame 10, and a battery is place on the battery tray 15 to supply electricity to the truck.

While the frame 10 is upright, the stabilizing bars 12 are brought into contact with the ground. When the handles 13 are pulled rearward to tilt the frame 10, the stabilizing bars 12 are removed from the ground and the truck of the present invention can be moved to other locations. Accordingly, the frame 10 should be kept upright while cargo is loaded or unloaded, and the frame 10 should be kept tilted and the platform plate 21 is removed from the ground by the rearward pulling of the handles 13 while cargo is being conveyed.

As depicted in FIGS. 1 to 3, the lifting platform 20 is comprised of a body 23 shaped in the form of a box open on its rear portion and supported by the guide rails 14 of the frame 10 and the rollers 22 of the body 23, a platform plate 21 attached to the lower end of the body 23, a first cover 24 detachably attached to the rear portion of the body 23, and a cargo support frame 25 attached to both ends of the upper portion of the body 23 and extended upward to support the rear side of loaded cargo.

In the lifting platform 20, the platform plate 21 attached to the front surface of the body 23 is loaded with cargo, loaded cargo is supported by the cargo support frame 25, thereby allowing the lifting platform 20 to be moved upward and downward along the guide rails 14 with the aid of rollers 22.

Additionally, the platform plate 21 is bent forward to form a support portion, reinforcing ribs (not shown) are formed along the circumferential portion of the platform plate 21 and the lower surface of the support portion of the platform plate 21, and the vertical portion of the platform plate 21 is secured to the platform body 23.

Figure 5:
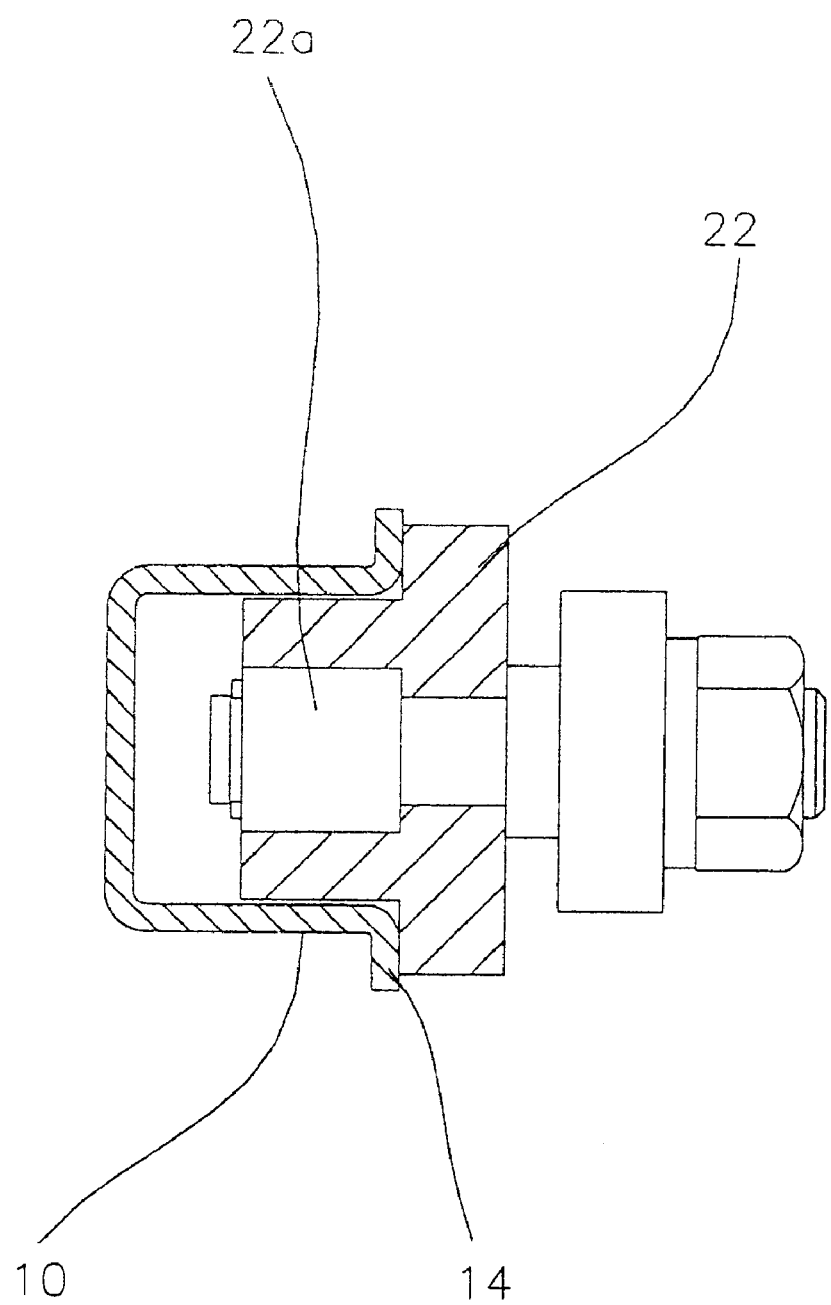
FIG. 5 is a partial sectional view showing a roller used in the hand truck of the present invention.

Referring to FIG. 5, in the rollers 22, a clutch bearing 22a, which is rotatable in a direction, is mounted in the body of each roller 22, and the clutch bearing 22a is secured to the platform body 23. Accordingly, while the platform body 23 is moved upward, the clutch bearing 22a is rotated; while the platform 23 is moved downward, the clutch bearing 22a is not rotated and causes friction with the sides of the guide rails 14. As a result, the rollers 22 serve as brakes while the platform body 23 is downwardly moved, and retard the downward moving of the platform body 23, so the rollers 22 are capable of preventing the first drive motor 33 and drive-related parts from being damaged.

The cargo support frame 25 is constructed by bending a pipe so as to form an upper arcuate portion and two side portions. The side portions are extended downwardly and secured to the upper end of the platform body 23, and two rings 25a are formed on the side portions of the cargo support frame 25. The strings for tying cargo to the frame 10 are fixed to the rings 25a.

Figure 9:
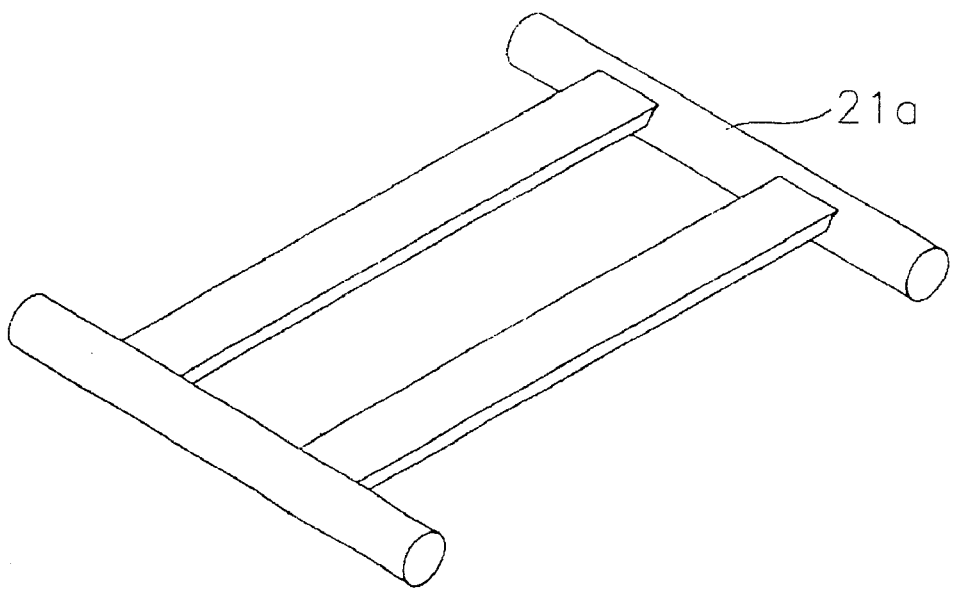
FIG. 9 is a perspective view showing an auxiliary member of the lifting platform.
Figure 10:
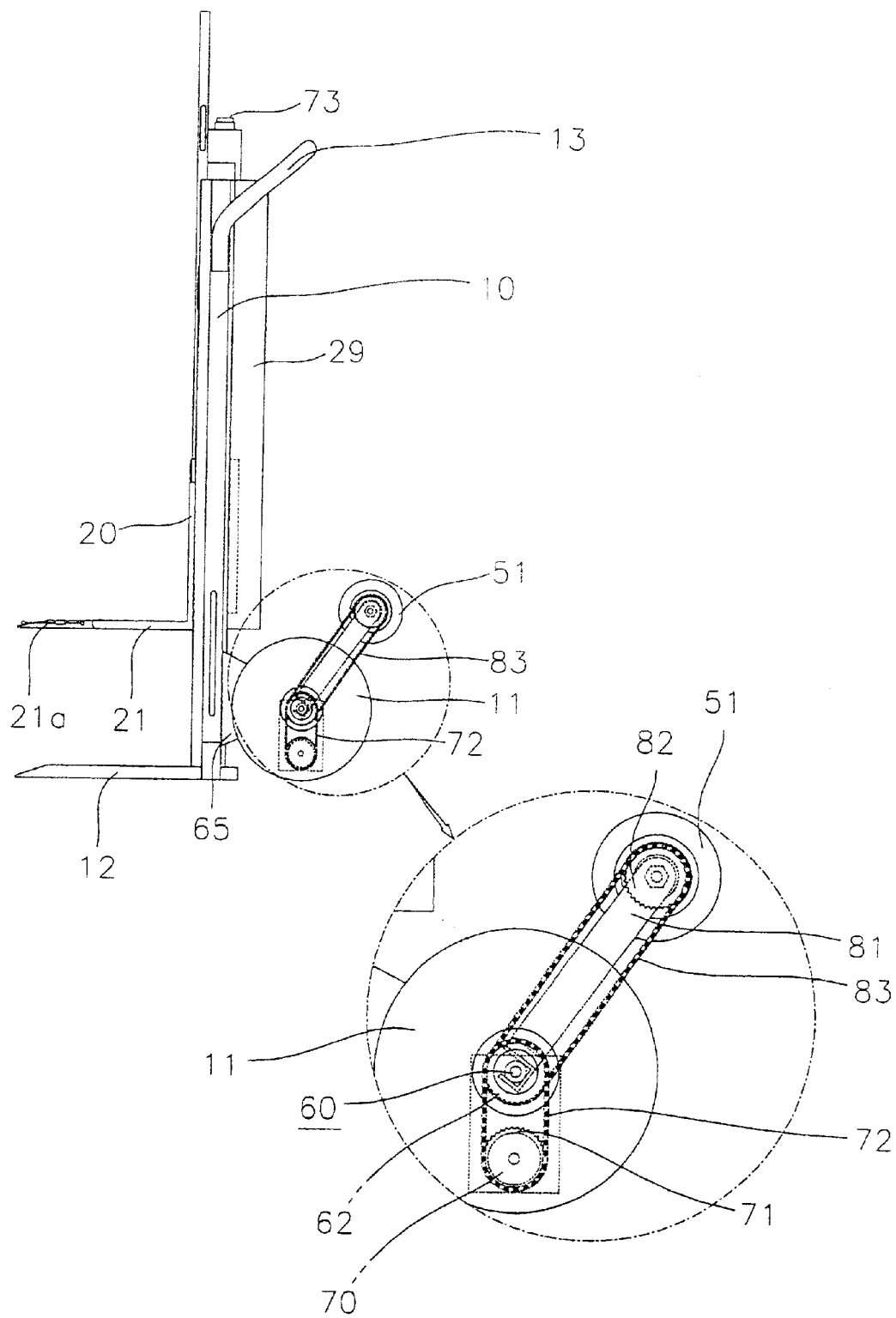
FIG. 10 is a side view showing the hand truck of FIG. 9.

FIGS. 9 and 10 are views showing different embodiments of the lifting platform 20. In this lifting platform 20, the lower half of a platform plate 21 is forwardly bent to form a support portion, a pair of slide slits are formed on both sides of the platform plate 21, and an auxiliary support frame 21a is situated to be moved forward and rearward through the slits.

Figure 8:
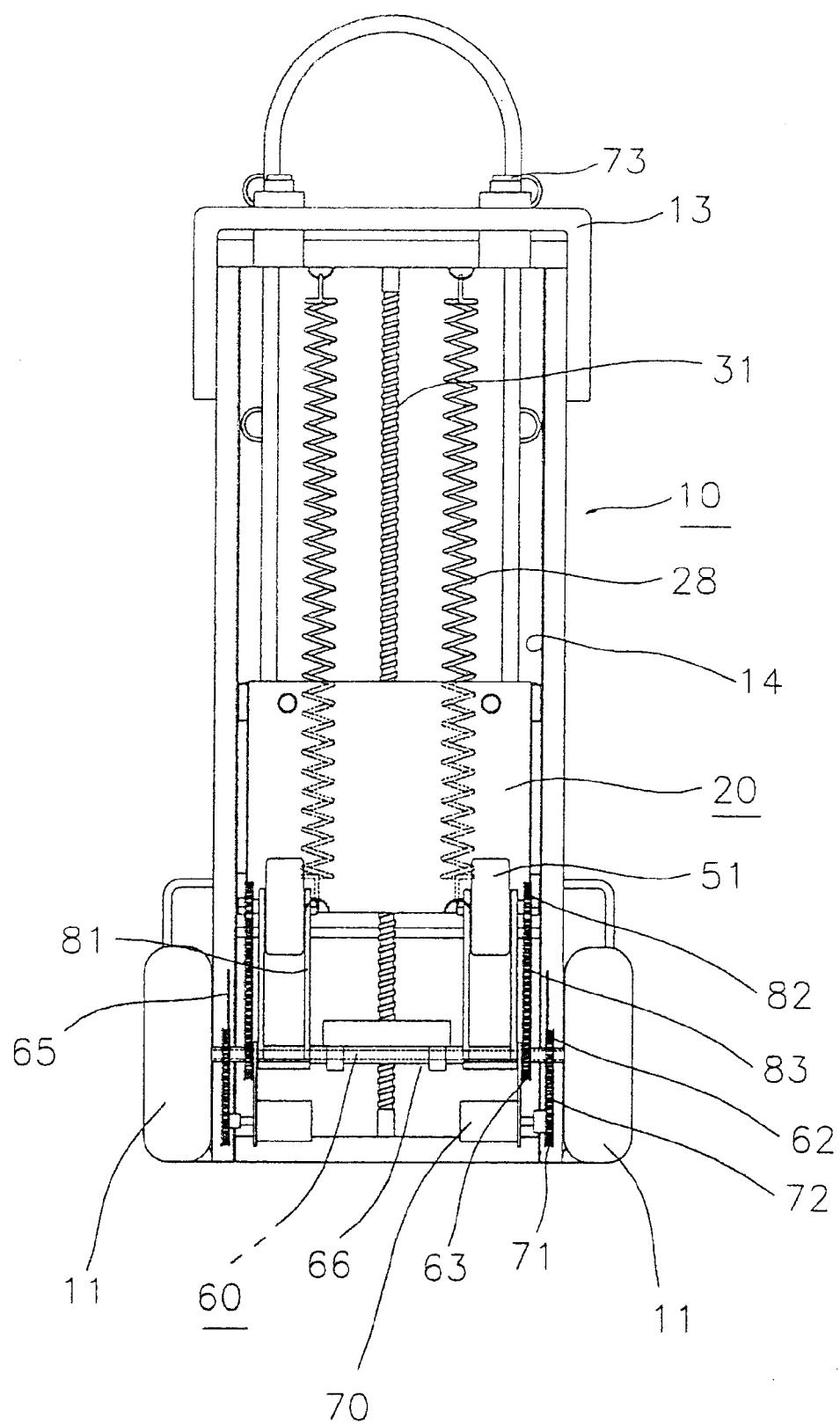
FIG. 8 is a rear view showing a hand truck with an electrically operated lifting platform in accordance with another embodiment of the present invention.

As shown in FIG. 8, two springs 28 are each positioned to connect the upper portion of the frame 10 and the platform plate 21 of the lifting platform 20. Accordingly, while cargo is moved upward, the load exerted on the first drive motor 33 is reduced by the action of the restoring force of the springs 28. As indicated in FIG. 10, a second cover 29 is detachably attached to the rear portion of the frame 10, so the second cover 29 can conceal the screw shaft 31 and the lifting platform 20, thereby improving the safety and appearance of the truck.

Referring to FIG. 3, two hooks 27 are detachably attached to the rear surface of the first cover 24, and can be moved together with the first cover 24.

When a downward switch button 42 is manipulated while the lower ends of the downwardly projected portions of the hooks 27 are supported on the loading platform of an automobile, the lifting platform 20 cannot be moved. Therefore, the frame 10 and the wheels 11 are moved upward, so the truck of the present invention can be easily loaded on the loading platform of an automobile.

The platform moving unit, as shown in FIGS. 2 and 3, is comprised of the first drive motor 33 fixedly attached to a bracket 32 secured to the rear surface of the platform body 23 to be situated between the platform body 23 and the first cover 24, a moving unit 30 engaged with the screw shaft 31 to be rotatable along the screw shaft 31 and supported on one side of the bracket 32, and an idle gear 35 for connecting the pinion gear 34 of the first drive motor 33 and the moving unit 30.

The moving unit 30 includes a hollow cylindrical body, and is rotatably supported by a bracket 32 secured to the platform body 23 at its upper and lower ends. In the moving unit 30, a gear portion 30a is formed on the outer surface of the moving unit body, the inner surface of the moving unit body is formed to have a ball screw structure, and balls contained in the moving unit body are positioned to be moved along a screw groove formed on the screw shaft 31. The gear portion 30a of the moving unit 30 is operationally connected to the first drive motor 33 through the idle gear 35.

The gear portion 30a is operationally connected to the first drive motor 33 through the idle gear 35 supported by the racket 32.

In accordance with the platform moving unit, when electricity is applied to the first drive motor 33, the idle gear 35 is rotated by the pinion gear 34 of the first drive motor 33 and the moving unit 30 is rotated and moved upward or downward by the idle gear 35 engaged with the gear portion 30a formed on the outer surface of the moving unit 30. As a result, the platform body 23 is rectilinearly moved along the screw shaft 31 together with the moving unit 30 and the bracket 32, thereby moving upwardly and downwardly cargo loaded on the platform plate 21 of the lifting platform 20.

In the control unit, the battery is placed on the battery tray 15 attached to the frame 10, the first drive motor 33 is electrically connected to the battery, and a control switch box 40 attached to the rear surface of the platform body 23 is electrically and controllably connected to the battery and the first drive motor 33. Additionally, an upward switch button 41 is mounted on one side of the upper portion of the frame 10 to move the lifting platform 20 upwardly, an upward switch button 41 is mounted on the other side of the upper portion of the frame 10 to move the lifting platform 20 downwardly, limit switches 43 are mounted on the upper and lower portions of the platform body 23, and the upward switch button 41, the downward switch button 42 and the limit switches 43 are controllably connected to a control switch box 40. On the meantime, the control switch box 40 is capable of controlling the first drive motor 33 through a reversible relay circuit, and the vertical stroke of the platform body 23 can be controlled by the upper and lower limit switch 43.

In the control unit, when the upward switch button 41 is pushed, the control switch box 40 allows electricity to be applied from the battery to the first drive motor 33, thereby rotating the first drive motor 33 in a normal direction. When the downward switch button 42 is pushed, the control switch box 40 allows reverse directional electricity to be applied to the first drive motor 33, thereby rotating the first drive motor 33 in the reverse direction. When the upward and downward switch buttons 41 and 42 are released, the control switch box 40 interrupts the flow of electricity and stops the first drive motor 33 that is being rotated. Additionally, when the limit switch 43 is brought into contact with the upper or lower portion of the frame 10 or an obstacle while the platform body 23 is moved upward or downward, the control switch box 40 interrupts the flow of electricity to the first drive motor 33 and stops the first drive motor 33.

That is, in the control unit, the platform body 23 and the platform plate 21 loaded with the cargo are lifted up along the guide rails 14 of the frame 10 and the screw shaft 31 when the upward switch button 41 is pushed, whereas the platform plate 21 is stopped when the upward switch button 41 is released. The platform body 23 and the platform plate 21 loaded with the cargo are lowered down along the guide rails 14 of the frame 10 and the screw shaft 31 when the downward switch button 41 is pushed, whereas the platform plate 21 is stopped when the downward switch button 41 is released. In addition, the platform body 23 and the platform plate 21 are stopped when the limit switch 43 is brought into contact with the upper or lower end of the frame 43.

Figure 6:
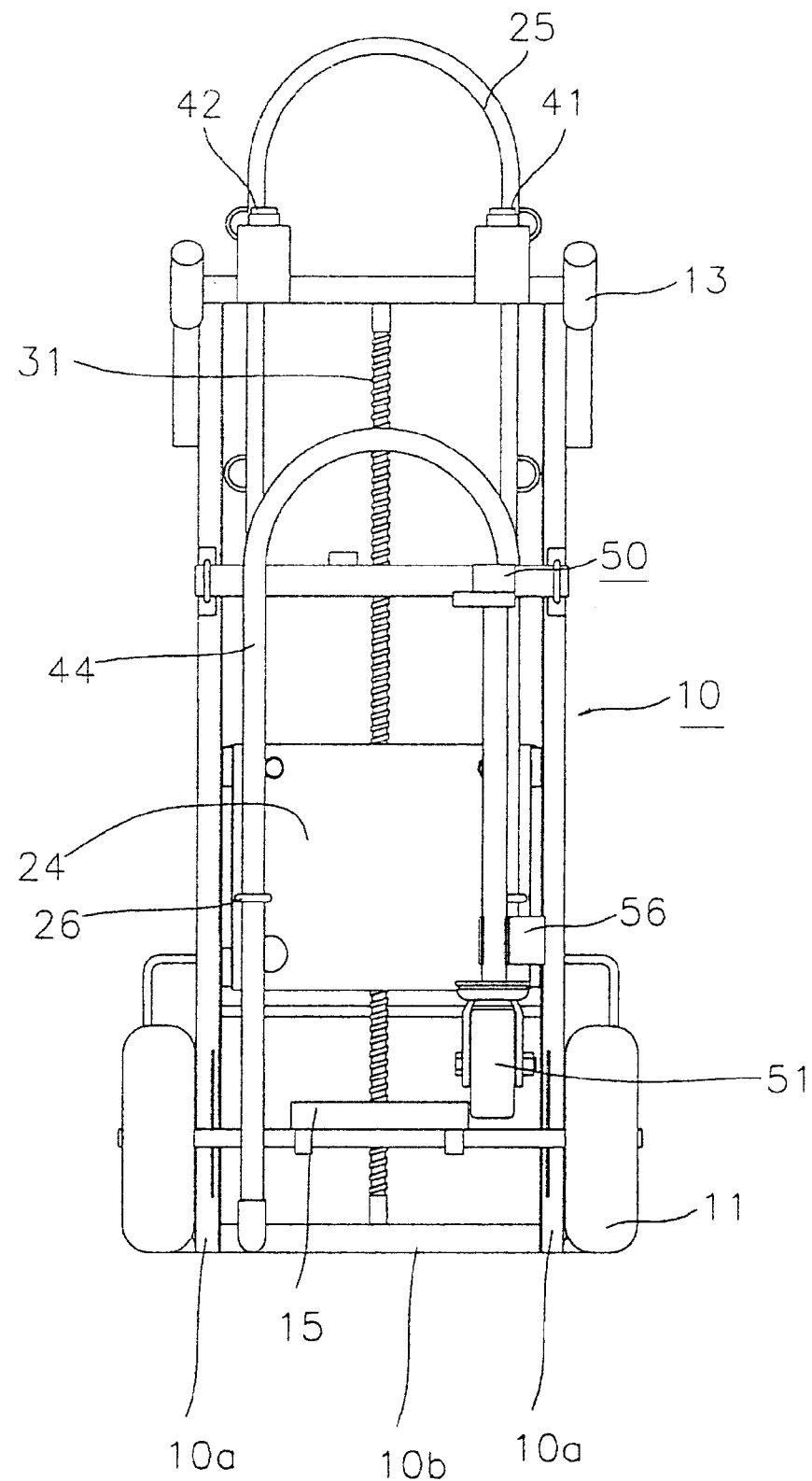
FIG. 6 is a rear view of the hand truck to which its cover and its corrugated tube are attached.
Figure 7:
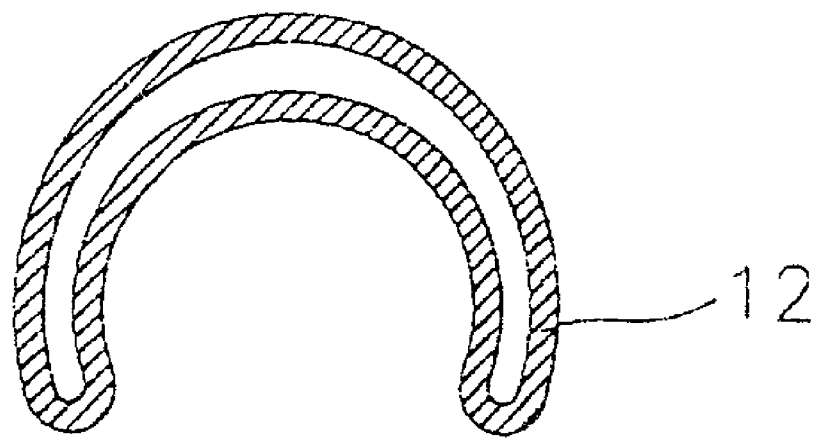
FIG. 7 is a cross section showing a stabilizing bar.

As shown in FIG. 6, the side portions of a corrugated tube 44 are secured to the first cover 44 by eye bolts 26 secured to the first cover 24 of the platform body 23, the upper portion of the corrugated tube 44 is held to be connected to the platform body 23 while being elastically bent, and electric wires connected to the platform moving unit are arranged through the interior of the corrugated tube 44.

In accordance with the present invention, when the platform body 23 is moved upward or downward, the upper portion of the corrugated tube 44 and the eye bolts 26 are moved upward or downward together with the platform body 23. When the positions of bents are changed, the bent portions of the corrugated tube 44 are guided by the holes of the eye bolts 26.

In addition, electric wires used for the control unit are arranged in the interior of the frame 10 because the frame 10 is fabricated of hollow pipes, and the electric wires used for the platform moving unit, as described above, are arranged in the interior of the corrugated tube 44. As a result, the appearance of the truck is improved and electric accidents can be prevented.

In addition, a connector, which is capable of being connected to the battery of an automobile, is mounted on one side of the battery tray 15, so the hand truck of the present invention can be operated for a long time everywhere an automobile is provided.

As shown in FIGS. 1 to 4 and 6, an auxiliary support pole unit 50, to which an auxiliary wheel 51 is rotatably attached to the lower end of the auxiliary support pole unit 50, is rotatably attached to the rear surface of the frame 10. Accordingly, when the hand truck of the present invention is loaded and carries relatively massive cargo, the auxiliary support pole unit 50 can be supported on the ground through the auxiliary wheel 51 while forming a certain angle with the frame 10.

In the auxiliary support pole unit 50, a cross bar 53 provided with a stopper 52 at its central portion is fixedly attached to the rear surface of the frame 10, a support pole 54 is attached at its one end to the cross bar 53 to be rotated at a certain angle with the aide of a restricting projection 55, and the auxiliary wheel 51 is rotatably attached to the other end of the support pole 54.

In a normal state, the support pole 54 is held on the rear surface of the frame 10 by a holding ring 56. When the hand truck of the present invention is loaded with massive cargo and the support pole 54 is released from the holding ring 56, the support pole 54 is capable of being rotated around the cross bar 53. When the support pole 54 is rotated at a predetermined angle, the restricting projection 55 is brought into contact with the stopper 52, thereby restricting the rotation of the support pole 54. The auxiliary wheels 51 come into contact with the ground while forming a predetermine angle with the frame 10, so the frame 10 is stably supported by the wheels 11 and 51 on the ground. When the handle 13 is pushed forward, the auxiliary wheels 51 are rolled on the ground, together with the main wheels 11 attached to the lower portion of the frame 10.

As illustrated in FIGS. 8 and 10 to 12, in a hand truck in accordance with another embodiment of the present invention, a drive shaft 60 connected at its both ends to two spaced wheels 11 and a second drive motor 70 are supported by a bracket in the lower rear portion of a frame 10, two auxiliary wheels 51 are supported on both sides of the surface of the frame 10 to be rotated rearward, a second drive motor 70 is connected to the drive shaft 60 to be rotated in one direction, and both ends of the drive shaft 60 are connected to the auxiliary wheels 51 to be moved in conjunction with the auxiliary wheels 51.

In accordance with the above embodiment, the wheels 11 and the drive shaft 60 are moved together and the wheels 11 are rolled according to the direction of force exerted to the frame 10. When electricity is applied to the second drive motor 70, the driving force of the second drive motor 70 causes the drive shaft 60 to be forcibly rotated. Accordingly, the wheels 11 are integrally rotated and the auxiliary wheels 51 are moved in conjunction with the drive shaft 60, so the hand truck of the present invention can be moved without the pulling of the handles 13 of the frame 10.

In this case, the drive shaft 60 is supported in such a way that the drive shaft 60 is rotatably inserted into the interior of the hollow pipe 66 to be supported by a bracket 65 secured to the rear surface of the frame 10. Two slave sprockets 62 are fitted over both end portions of the drive shaft 60 to be rotated in one direction. Two conjunctive sprockets 63 are each fitted over the drive shaft 60 at a position inwardly spaced apart from each slave sprocket 62.

When the slave sprockets 62 are operationally connected to the second drive motor 70 and receive driving force from the second drive motor 70, the drive shaft 60 is rotated in the driving direction of the second drive motor 70 by the slave sprockets 62 forcibly rotated. On the other hand, when driving force is not transmitted, the slave sprockets 62 serve as clutches and allow no-load operation.

The second drive motor 70 is attached to the rear portion of the frame 10 and the outer surface of the hollow pipe 66, two drive sprockets 71 are rotatably attached to the ends of the armature rotating shaft of the second drive motors 70, and the drive sprockets are connected to the slave sprockets fitted over the drive shaft 60. Additionally, a manipulating switch 73 is provided on one side of the handle 13 attached to the side of the frame 10, and controls the application of electricity from power source to the second drive motors 70.

When the switch is manipulated, electricity is applied to the second drive motor 70 and the drive sprocket 71 is rotated. Rotating force is transmitted from the drive sprocket 71 to the slave sprocket 62 through a drive chain 72, so the slave sprocket 62 is rotated, thereby allowing the drive shaft 60 to be rotated in a direction.

The drive chain 72 is preferably supported tightly by an idle sprocket operated without load so that the drive chain 72 is prevented from sagging.

Two support rods 81 are rotatably attached at their first ends to the rear portion of the frame 10 or the outer surface of the hollow pipe 66, two auxiliary wheels 51 are rotatably attached to the second ends of the support rods 81 by rotating shafts, two auxiliary sprockets 83 are fitted around the rotating shafts, and the rotating shafts are connected to the conjunctive sprockets 63 by the conjunctive chains 83 to be moved together.

The auxiliary wheels 51 are spaced apart from and situated below the main wheels 11. Accordingly, when the hand truck is loaded with cargo and the handle 13 is pulled rearward, the auxiliary wheels 51 are brought into contact with the level ground or stairs. As the main wheels 61 are rotated, the auxiliary sprockets 82 moved in conjunction with the conjunctive sprockets 63 fitted over the drive shaft 60 are moved together, thereby allowing the hand truck of the present invention to be easily moved.

Two fitting holes are formed on the second ends of the support rods 81, and the rotating shafts are detachably fitted into the fitting holes. In this case, the conjunctive chains 83 can be kept tight by the adjustment of the positions of the rotating shafts.

The handle 13 is comprised of a single piece bent at its both ends.

Figure 11:
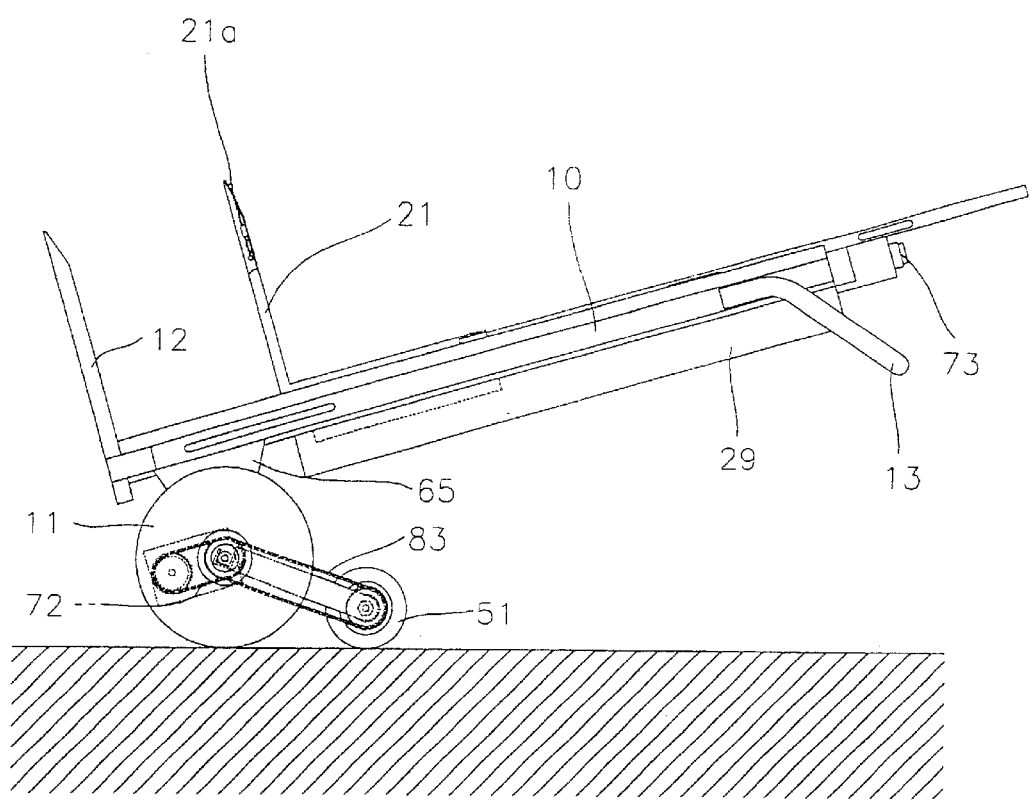
FIG. 11 is a side view showing the hand truck of FIG. 9, the hand truck being used on the level ground.
Figure 12:
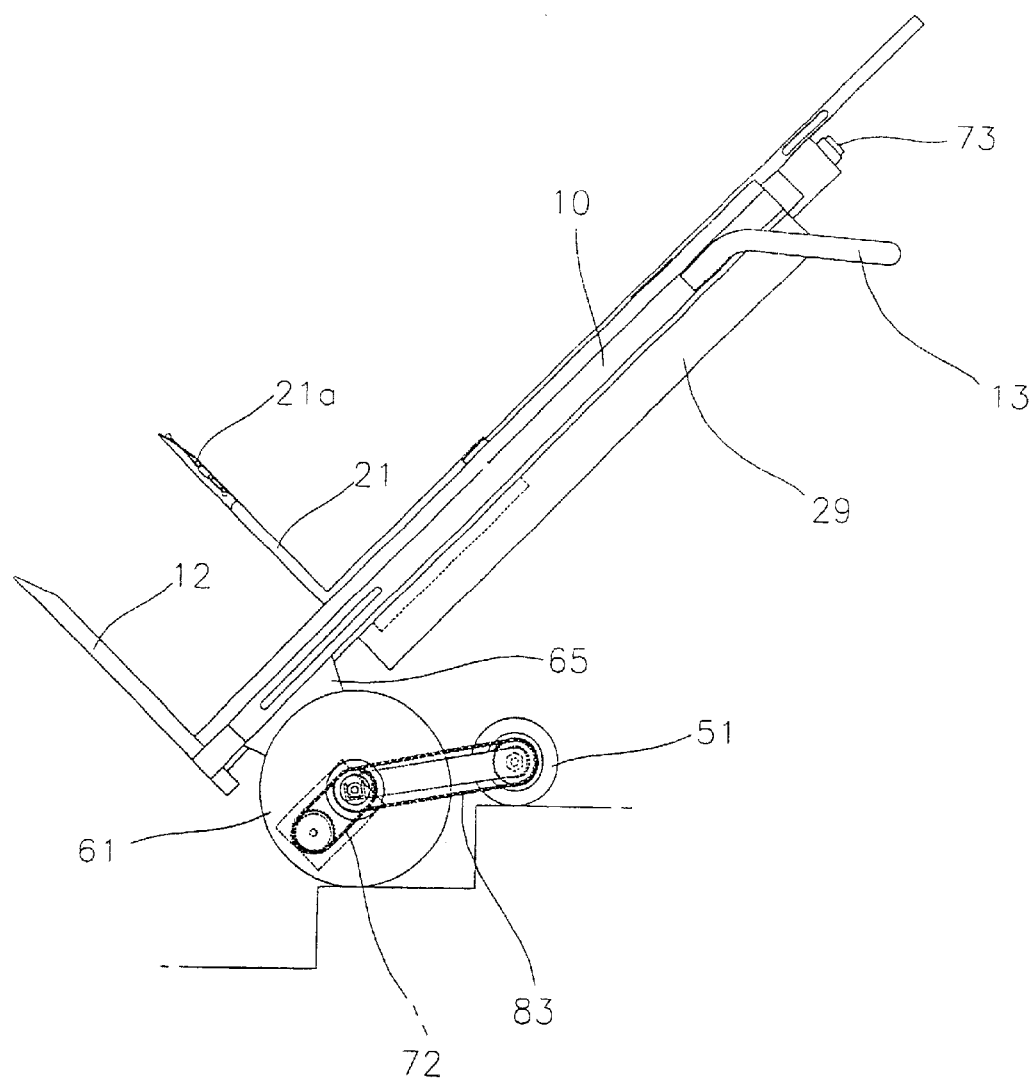
FIG. 12 is a side view showing the hand truck of FIG. 9, the hand truck being used on steps.

As shown in FIGS. 11 and 12, in accordance with this embodiment of the present invention, the wheels 11 and the auxiliary wheels 51 are spaced apart from each other and are situated at different vertical positions, so the wheels 11 and 51 are smoothly rolled on the level ground, thereby allowing cargo to be conveyed easily. When the second drive motor 70 is operated while the truck is tilted by handling the handle 13 attached to the upper portion of the frame 10, the second drive motor 70 forcibly rotates the wheels 11 and the auxiliary wheels 51 to be smoothly rolled on an upward slope and stairs, thereby facilitating the conveyance of cargo.

As described above, the present invention provides a hand truck with an electrically operated lifting platform, in which the lifting platform is rotatably and vertically supported by a frame and a platform moving unit moves the lifting platform by the conversion of rotary motion into rectilinear motion, thereby simplifying its entire structure in comparison with other conventional hand platforms and allowing the hand truck to be easily moved on an upward slope and stairs by the provision of auxiliary wheels spaced apart from main wheels and the forcible operation of these wheels.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A hand truck with an electrically operated lifting platform, comprising:
    a frame on both sides of which two guide rails are formed, said frame being provided with a screw shaft vertically supported on the frame to be vertically moved, one or more stabilizing bars forwardly extended from the frame and two wheels rotatably attached to a rear portion of the frame;
    connecting frame member on top and lower portions of said two guide rails, including vertical rods located outboard of the guide rails and that at an upper portion of each said vertical rods extends a handle;
    said lifting platform guided by said guide rails and engaged with said screw shaft;
    a platform moving unit including a first drive motor for providing rotating force, said platform being situated in said lifting platform to allow said lifting platform to be moved selectively upward and downward along the screw shaft by an operation of said first drive motor;
    a control unit electrically and controllably connected to said first drive motor and a power source;
    one or more springs, said springs each connecting an upper end of said frame and a rear portion of said lifting platform, said springs providing a counterbalancing restoring force to reduce a load placed on said first drive motor; and
    an auxiliary support pole unit, said auxiliary support pole unit being provided at its lower end with an auxiliary wheel and restricted to a certain angle of rotation.

2. The hand truck according to claim 1, wherein said stabilizing bars are forwardly bent.

3. The hand truck according to claim 1, wherein a drive shaft is coupled to said wheels, and a second drive motor supported on the rear portion of said frame is connected to said drive shaft to rotate in one direction.

4. The hand truck according to claim 3, further comprising at least one conjunctive sprocket fitting around both end portions of said drive shaft and at least one auxiliary sprocket fitting around said rotating shafts, said at least one conjunctive sprocket connected to said at least one auxiliary sprocket by conjunctive chains.

5. The hand truck according to claim 1, further comprising two support rods attached to both sides of the rear surface of said frame to be rearwardly rotated at a predetermined angle, and two auxiliary wheels rotatably attached to said support rods by rotating shafts.

6. The hand truck according to claim 1, wherein said moving unit include a hollow cylindrical body rotatably supported by a bracket secured to the platform body at upper and lower ends, a gear portion formed on an outer surface of the moving unit body, an inner surface of the moving unit body formed to have a ball screw structure, balls contained in the moving unit body positioned to be moved along a screw groove formed on a screw shaft.

* * * * *